Aug. 22, 1961     W. A. MOAKLER     2,997,631
NON-LINEAR TIME DELAY CIRCUIT AND RELAY
Filed Aug. 14, 1958
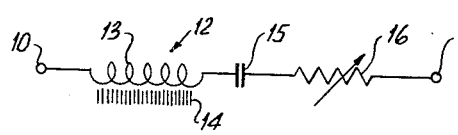
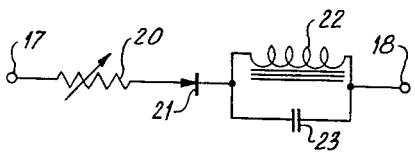
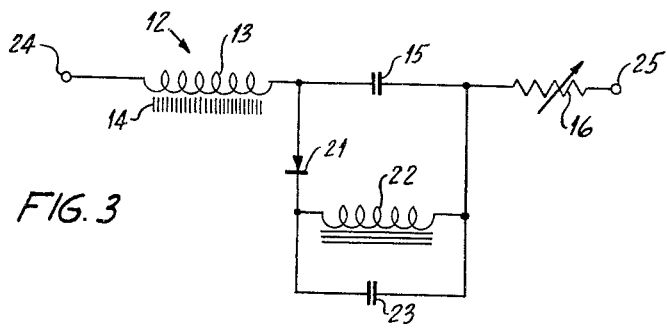
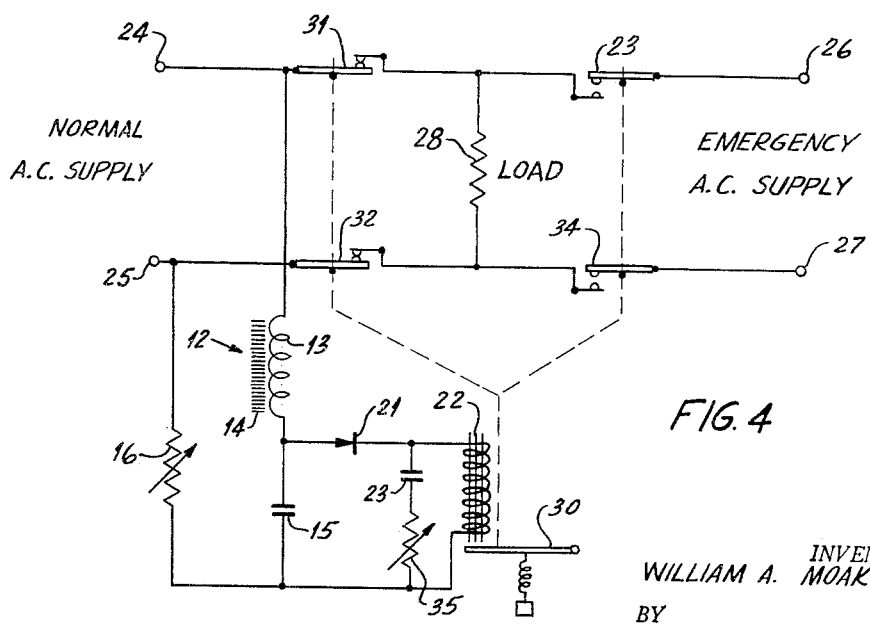
INVENTOR:
WILLIAM A. MOAKLER
BY
Frederick Breitenfeld
ATTORNEY

United States Patent Office 2,997,631
Patented Aug. 22, 1961

2,997,631
NON-LINEAR TIME DELAY CIRCUIT AND RELAY
William A. Moakler, Bergenfield, N.J., assignor to Automatic Switch Co., Florham Park, N.J., a corporation of New York
Filed Aug. 14, 1958, Ser. No. 755,105
3 Claims. (Cl. 317—147)

This invention relates generally to electric circuits, and has particular reference to non-linear resonant circuits.

The phenomenon of ferro or non-linear resonance is used in various circuits involving relays and regulators. It is predicated upon the arrangement, in series, of a suitably matched reactor and capacitor, whereby the current flow varies in non-linear proportion to the applied alternating current whenever a condition of resonance is established.

It is a general object of this invention to provide an improvement in this type of circuit, whereby the time it takes for the current to complete its change under resonant conditions can be controlled in a predetermined manner. The significance of this lies in the fact that the circuit can be employed to control the activation of a magnet or solenoid in accordance with a pre-selected pattern of delayed action.

A more particular object of the invention is to adapt the improved circuit to a voltage-sensitive relay and thereby provide an improved relay whose response to voltage changes is of a specialized nature highly useful in many industrial applications. More particularly, the improved relay may be so designed as to be highly sensitive to relatively close voltage differentials, yet immune to voltage changes which are only of short-lived duration.

The improved circuit of this invention involves the combination in a special manner of a non-linear series resonant circuit of the character referred to, and a branch circuit in the nature of a capacitor charge-and-discharge arrangement. More specifically, the series circuit includes as components a first capacitor and a first reactor, the reactor having a saturable core and the reactance values of said components being of pre-selected magnitudes so that a resonance is established at a pre-selected voltage; and the branch circuit is shunted across one of said components, preferably the capacitor, and comprises a rectifier, and a second reactor-capacitor pair arranged in parallel and receptive to the rectifier current emanating from the rectifier. The desired electrical action results from the circumstance that the second-named capacitor has a changing impedance as it charges and discharges, as a result of which changes are brought about in the impedance of the first-named capacitor to delay the rise or fall of the current under resonant conditions. Preferably a variable resistor is in series with the second-named capacitor so that its rate of charge can be varied.

A further and more particular object of the invention is to provide an improve an improved electrical transfer system in which the benefits and advantages of the new circuit are attained in connection with the operation of a double-throw transfer switch or its equivalent. As is well known, in the operation of many installations where a continuity of electrical power at a predetermined voltage is to be maintained, two or more alternative sources of power are provided for, and a transfer switch of suitable character automatically transfers the load from one source to another under proper circumstances. As a direct result of the improved electrical circuit of the present invention, this action can be brought about by a single moving unit which embodies in a relatively simple instrumentality the combined features of a close differential voltage-sensitive relay, a delay in response to merely momentary reductions of voltage below a selected proper value, and a similar delay in response to merely momentary restorations of voltage. Heretofore a performance of this kind has required a relatively complex aggregation of equipment including a double-throw contactor, a voltage relay, and one or more time-delay relays, not to mention the circuitry involved.

Another object of the invention is to provide a circuit and relay which is not only extremely simple from an electrical and structural standpoint but also readily adjustable to suit varying requirements of use. Moreover, the duration of the delay in activating the electromagnetic device, upon a rise in voltage, and the duration of the delay in releasing the relay armature, upon a fall in voltage, may be independently adjusted. By means of this invention, a delay time of as much as 10 seconds can be provided for.

For a better understanding of the invention, together with other and further objects thereof, reference is made to the following description taken in connection with the accompanying drawings, in which—

FIG. 1 is a schematic diagram of connections showing a series circuit which includes a saturable core reactor;

FIG. 2 is a diagram of connections showing a delay circuit including a storage capacitor;

FIG. 3 is a schematic diagram of a circuit embodying the features of the invention; and FIG. 4 is a diagram of connections showing one application of the invention to a switching arrangement for transferring a load from one power supply to another.

The circuit shown in FIG. 1 includes a pair of terminals 10, 11, which are to be connected to a source of alternating current having a stabilized frequency. The circuit also includes a saturable-core reactor 12 having a winding 13 and a core 14. In series with the reactor 12 is a capacitor 15 and a variable resistor 16. This type of circuit is well-known in the art and has been used in voltage regulator circuits and other types of circuits which require a nonlinear response. When alternating current is first applied to terminals 10, 11, a small current flows through the circuit because the impedance of the reactor 12 is quite large and is not compensated for by the capacitative reactance of capacitor 15. However, the current through winding 13 causes a partial saturation of the core 14 which brings the reactor and capacitor closer to resonance, thereby increasing the current. As the current increases, the core becomes more saturated and the inductance becomes lower until the reactance of reactor 12 matches the reactance of capacitor 15. This is the resonant condition and permits a large current to flow through the circuit.

The circuit shown in FIG. 2 includes terminals 17 and 18 which are to be connected to a source of alternating power. The circuit includes a variable resistor 20, a rectifier unit 21, and a linear reactor 22 in series between terminals 17 and 18. Bridged across reactor 22 is a storage capacitor 23 which generally is an electrolytic capacitor since it must have a high value of capacitance and is in a direct current circuit. However, the invention is not limited to this type and any other type of capacitor may be used in the circuit. Also, although there is shown only a single element rectifier which passes uni-directional current pulses to the parallel circuit 22, 23, it is to be understood that any type of rectifier circuit, whether half or full-wave, may be used in this connection. When alternating current is first applied to terminals 17 and 18, current pulses through the capacitor are relatively large, depending only upon the value of resistor 20. After a short time, capacitor 23 charges up to a direct current potential sufficient to force a large direct current through inductor 22. The time of charge of capacitor 23 depends upon the values of resistor 20 and capacitor 23. When the alternating current power is disconnected, capacitor 23 discharges through inductor 22 thereby maintaining a current through this inductor for a time interval after the power has been disconnected.

The circuit shown in FIG. 3 is a combination of the circuits shown in FIGS. 1 and 2 and includes terminals 24 and 25, a saturable core reactor 12 having a winding 13 and a saturable core 14, a capacitor 15, and a variable resistor 16. Bridged across capacitor 15 is a rectifier 21 and an inductor 22 with a storage capacitor 23 connected in parallel with the inductor. This combination circuit operates as follows: When alternating current power is first applied to terminals 24, 25, the current increases in a manner as described above in connection with the operation of the circuit shown in FIG. 1. The increase in current through this circuit produces a corresponding increase in voltage across capacitor 15 until at resonance the voltage across capacitor 15 may be several times larger than the terminal voltage applied to terminals 24 and 25. The voltage across capacitor 15 is applied to rectifier 21 and uni-directional current pulses are applied to the parallel circuit which includes inductor 22 and capacitor 23. This capacitor slowly charges up and thereby increases the direct current potential across inductor 22. Since inductor 22 may have a low resistance value, the increase in direct current potential may produce a high direct current through the winding of this inductor and thereby create a large amount of magnetic flux in the core. The changing impedance of the capacitor 23 as it becomes charged affects the impedance of the capacitor 15 and in this way the current flow through the circuit may be delayed in a predetermined manner. The extent of the delay period may be controlled to suit requirements, by a proper selection of reactance and resistance values. Where the reactor 22 is employed as the activating element of an electromagnetic device, it follows that a delay in the passage of adequate current through the reactor will bring about a corresponding delay in the operation of the electromagnetic device.

The circuit shown in FIG. 4 is a practical application of the circuit shown in FIG. 3. Terminals 24 and 25 are connected to what has been designated, for purposes of illustration, as a "normal" alternating current power supply, while terminals 26 and 27 are connected to an "emergency" alternating current power supply, the latter to be connected to a load 28 in case the normal power fails. Inductor 22 is supplied with an armature 30 which is mechanically coupled to two normally closed contacts 31 and 32, these contacts normally connecting terminals 24 and 25 to the load 28. Armature 30 is also mechanically coupled to normally open contacts 33 and 34 which, when closed by the actuation of armature 30, connect terminals 26 and 27 to the load 28.

The delay circuit is essentially the same as that shown in FIG. 3 except that a variable resistor 35 has been added in series with storage capacitor 23 to enhance the adjustability of the circuit and to provide a variable time interval for the operation of armature 30.

While the normal A.C. supply is effective, current passes through the series circuit 13, 15 and 16, and also through the parallel circuit 22, 23, and 35, as described above, causing the actuation of armature 30. This closes contacts 31 and 32 and maintains "emergency" contacts 33 and 34 in an open condition. If now the normal supply voltage should fail, or fall below a preselected value, the armature 30 will fall back to its unactuated position, opening contacts 31 and 32 and closing contacts 33 and 34, thereby connecting the emergency supply. This operation may be adjusted to take up to ten seconds or more, so that any merely momentary disruption of normal supply voltage will not actuate the armature 30. Similarly after the emergency supply has been connected, short-lived voltage restorations applied to terminals 24 and 25 will be ignored and will not actuate the circuit. Only a sustained normal supply voltage lasting more than the selected time interval will cause the actuation of armature 30 and re-connection to the normal A.C. supply.

If desired, the delay on drop-out of the armature can be additionally and independently adjusted by adjusting the air gap at the armature pole face.

It will be understood that the details herein described and illustrated may be modified in various ways without necessarily departing from the spirit and scope of the invention as expressed in the appended claims.

What is claimed is:

1. The combination with a non-linear series resonant circuit including a first inductor having a saturable core and a first capacitor, both connected in series with a source of alternating current, of a means for delaying the abrupt change in value of the current in said circuit when a resonance-engendering voltage is applied to said circuit, said means being a branch circuit shunted across said first capacitor and comprising a rectifier in series with a second capacitor and a second inductor, said second capacitor and second inductor being connected in parallel.

2. The combination defined in claim 1, including also a resistor in series with said second capacitor.

3. The combination defined in claim 1 wherein said second inductor is the coil of a relay, the operation of the relay upon application of resonance-engendering voltage to said series resonant circuit being delayed by said delay means.

References Cited in the file of this patent

UNITED STATES PATENTS

| | | |
|---|---|---|
| 2,021,754 | Suits | Nov. 19, 1935 |
| 2,200,968 | Runaldue | May 14, 1940 |
| 2,210,669 | Johnson | Aug. 6, 1940 |
| 2,216,598 | Minneci | Oct. 1, 1940 |
| 2,542,638 | Desch | Feb. 20, 1951 |